A. L. G. DEHNE.
Sugar Filter.
No. 79,558.
Patented July 7, 1868.
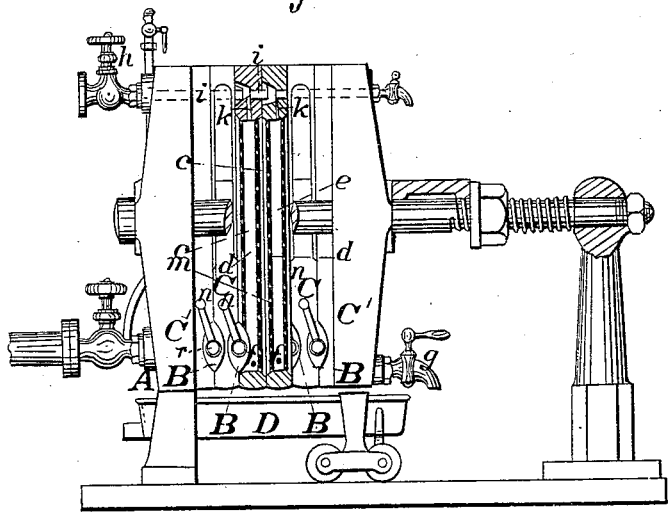
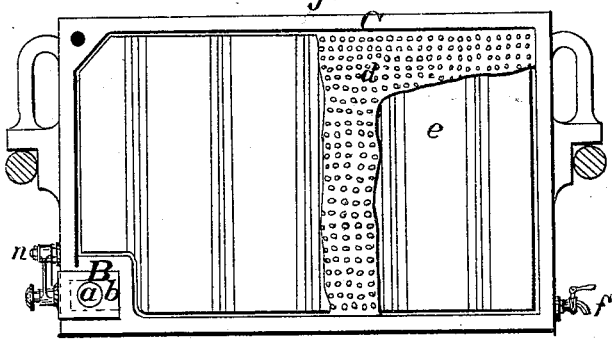

United States Patent Office.

ALBERT LUDWIG GEORG DEHNE, OF HALLE-ON-SAALE, PRUSSIA.

Letters Patent No. 79,558, dated July 7, 1868.

IMPROVED MACHINE FOR FILTERING AND REFINING SUGAR.

The Schedule referred to in these Letters Patent and making part of the same.

TO ALL WHOM IT MAY CONCERN:

Be it known that I, ALBERT LUDWIG GEORG DEHNE, of Halle-on-Saale, in the Kingdom of Prussia, have invented a new and useful Improvement in Filtering-Apparatus for Sugar-Refining and other purposes, of which the following is a full, clear, and exact description, reference being had to the accompanying drawing, forming part of this specification, and in which—

Figure 1 represents a partly sectional side elevation of an apparatus constructed in accordance with my improvement, Figure 2 a face view of one of the screening or filtering-chambers detached, with its screen broken away or shown only in part, and Figure 3 a transverse section, on an enlarged scale, of one of the pockets used in connection with the screening or filtering-chambers.

Similar letters of reference indicate corresponding parts.

This invention relates to apparatus used for filtering liquids of a thick or semi-fluid character, more especially those, the body or polluting parts of which fail to form a plastic or hard cake in the chambers of the filtering-press or apparatus, but consist of slimy or such like matters that, after a certain period of operation, cover the filtering-medium of the apparatus with an impenetrable coat which arrests filtration.

My invention obviates this difficulty, and enables me, for instance, to filter the juice of sugar-refineries, and to empty the chambers of the press of remaining juice when filtration ceases through collection or formation of the slimy coat on the cloths or filtering-medium; also, to wash, by the admission of water, the different parts of the press; likewise to remove the slimy material, or, by opening the press, the filtering-medium or devices covered by it.

My invention, to accomplish these ends or purposes, consists, firstly, in a combination or arrangement of parts whereby the juice or semi-fluid is made to enter the chambers of the filtering-press or apparatus at their lowest parts, by means of a canal formed by pockets and apertures in the frame or frames corresponding therewith.

Said invention likewise includes a combination of movable pockets with the frames of the press, having apertures in or through them, communicating with the pockets; likewise, the formation of a canal in the lower part of the frames, as formed by the movable pockets and apertures in the frames, said canal serving the double purpose of introducing the juice or semi-fluid, and of drawing off what remains of these latter when filtration ceases.

And, furthermore, the invention covers the combined use of cotton cloth and linen trellis as a filter-medium or cloth in an apparatus of the character herein described.

Referring to the accompanying drawing, the semi-fluid or juice to be filtered is introduced to the lowest parts of the filtering-chambers, by forcing it, under pressure, through an inlet-pipe, A, on opening a cock provided in said pipe or extension connected with it, and is caused to pass into the several pockets, B, a canal, $r$, being formed throughout the entire length of the press by side openings $a$ made in the pockets, and holes in the frames C and C' to correspond, the pockets being intermediate of the frames. The juice is passed from the pockets B, through their open inner ends $b$, into the filtering-chambers $m$, formed by the frames C C', and rises in these chambers, so as to fill them. The continuous flow of juice under pressure causes the juice to be filtered through any suitable filtering-medium, but preferably cotton cloth and linen trellis combined, interposed between the frames which compose the chambers, whereby a filter-bed or slimy coat is formed on or against said cloths $c$, the filtered juice running on the other side of the cloths, through perforated plates, $d$, into the interior spaces or chambers $e$ of the frames, and is drawn off, by outlets $f$, into a trough or gutter, D. This filtering operation proceeds until stopped by the slimy coat on the cloths, which prevents the passage of juice through them. The further entrance of juice into the press is then arrested, by closing the cock of the inlet-pipe A, and the chambers or spaces $m$ between the frames emptied of juice by opening the cock $g$, and, it may be, the running off facilitated by opening a suitable air-cock. When the several chambers and spaces have been thus emptied, the cocks $g$ and $f'$ are shut, and by opening a cock, $h$, which establishes or breaks connection with a cold-water reservoir, water is made to flow into a canal, $i$, and by suitable passages or branches, $k$, into the interior of the frames.

The water then penetrates both ways, that is, right and left, into the chambers or spaces $m$, between the frames, and washes or sweetens all the interior parts of the press, and the water thus sweetened finally drawn off by the cocks $f'$ into the gutter D.

By means of the pockets B, and the canal formed by these pockets, and corresponding holes in the frames, arranged to establish the admission in or through the lowest parts of the chambers, cock $g$, to the end of the canal so established, and cocks $f'$ to the several frames or spaces between the chambers $m$, to a filtering-press or apparatus of the character herein described, semi-fluids, such as the juice of sugar-refineries, (the body or polluting parts of which consist of a slimy or such like matter,) may be filtered, and the remainder of the juice be withdrawn without unscrewing the press, as usually necessary. Every facility is afforded for opening the press, and the pockets B it is preferred to pivot by arms, as at $n$, to the frames, so as to make the frames carry the weight of the pockets, also hold them in proper place or position, and for the purpose of facilitating the entry of the filtering-cloth on both sides of them. Said filtering-cloths I prefer to make by combining a layer or layers of cotton cloth with a layer or sheet or layers or sheets of linen trellis, arranged to lie face to face, the one against or on the other.

*Claims.*

1. The combination, with the filtering-chambers or spaces formed by and between the frames C C', of the inlet-pipe A, arranged by or in connection with pockets B and canal $r$, formed by apertures, $a$, in the sides of the pockets and holes in the frames, to introduce the juice or fluid at or to the lower parts of the chambers $m$, substantially as specified.

2. The swinging or movable pockets B, having apertures, $a$, through their sides, in combination with the frames C C', having holes therein to form a continuous channel, $r$, essentially as shown and described.

3. The canal $r$, in the lower part of the frame of a filtering-apparatus, formed by the pockets and holes in the frame as described, in combination with the cocks $f'$ to the spaces $e$ of the frames, cock $g$, water-cock $h$, canal $i$, with its branches $k$, substantially as and for the purpose or purposes herein set forth.

4. The combination, to form a filtering-cloth between the frames of the press, of adjacent sheets or layers of cotton cloth and linen trellis, as herein set forth.

This specification signed by me, this 11th day of February, A. D. 1868.

ALBERT LUDWIG GEORG DEHNE. [L. S.]

Witnesses:
  ERNST SAMUEL SCHÖNE,
  CARL GOTTLIEB BERTHOLD.